US012679488B1

(12) United States Patent
Muniz Penedo et al.

(10) Patent No.: US 12,679,488 B1
(45) Date of Patent: Jul. 14, 2026

(54) BICYCLE STABILIZING ASSEMBLY

(71) Applicants: Fermin Muniz Penedo, Miramar, FL (US); Felix Enrique Muniz Penedo, Rochester, NY (US)

(72) Inventors: Fermin Muniz Penedo, Miramar, FL (US); Felix Enrique Muniz Penedo, Rochester, NY (US)

( * ) Notice: Subject to any disclaimer, the term of this patent is extended or adjusted under 35 U.S.C. 154(b) by 403 days.

(21) Appl. No.: 18/531,265

(22) Filed: Dec. 6, 2023

Related U.S. Application Data

(60) Provisional application No. 63/491,509, filed on Mar. 21, 2023.

(51) Int. Cl.
 *B62H 1/12* (2006.01)

(52) U.S. Cl.
 CPC ...................................... *B62H 1/12* (2013.01)

(58) Field of Classification Search
 CPC ................................... B62H 1/12; B62H 7/00
 USPC ......................................................... 280/301
 See application file for complete search history.

(56) References Cited

U.S. PATENT DOCUMENTS

| | | | |
|---|---|---|---|
| 578,937 | A | 3/1897 | Lincoln |
| 590,568 | A | 9/1897 | Erwin |
| 661,145 | A | 11/1900 | Hausmann |
| 2,612,388 | A | 9/1952 | McNeill |
| 2,647,764 | A | 8/1953 | Anderson |
| 2,723,133 | A | 11/1955 | Pawsat |

| | | | | |
|---|---|---|---|---|
| 2,784,008 | A | | 3/1957 | Pearl |
| 3,877,727 | A | * | 4/1975 | Johannsen ................ B62H 1/12 |
| | | | | 280/301 |
| 4,154,452 | A | | 5/1979 | Newman |
| 4,326,729 | A | | 4/1982 | Luckowski |
| 4,615,535 | A | * | 10/1986 | McMurtrey .............. B62H 1/12 |
| | | | | 280/293 |
| 5,054,803 | A | | 10/1991 | Ellingsen, Jr. |
| 5,133,569 | A | * | 7/1992 | Rieber ..................... B62H 7/00 |
| | | | | 180/209 |
| 5,293,786 | A | * | 3/1994 | Hsu .......................... B62H 1/00 |
| | | | | 74/564 |
| 6,709,000 | B1 | | 3/2004 | Blake |
| D554,039 | S | * | 10/2007 | Bulson ......................... D12/223 |
| 10,059,395 | B2 | * | 8/2018 | Ahmed .................... B62H 7/00 |
| 10,807,663 | B1 | | 10/2020 | Nanouk |
| 2005/0134019 | A1 | | 6/2005 | Plana |
| 2017/0369113 | A1 | | 12/2017 | Ahmed |

\* cited by examiner

*Primary Examiner* — Valentin Neacsu
*Assistant Examiner* — Hosam Shabara
(74) *Attorney, Agent, or Firm* — Goldstein Law Offices, P.C.

(57) ABSTRACT

A bicycle stabilizing assembly includes a mounting bracket configured to universally attach to a frame of any bicycle. The mounting bracket includes a plate portion, a track portion, and a stabilizing arm. The track portion extends along the top edge of the plate portion such that the plate portion is substantially parallel to the track portion. The track portion includes one or more arcuate channels defined by an arc. The arcuate channel is configured to slidably engage a retaining bracket between a first end and a second end. The plate portion includes a socket configured to rotatably engage a proximal end of the stabilizing arm such that an orientation of the stabilizing arm with respect to the mounting bracket may be adjusted. The stabilizing arm is further configured to retain a training wheel at its distal end.

20 Claims, 14 Drawing Sheets

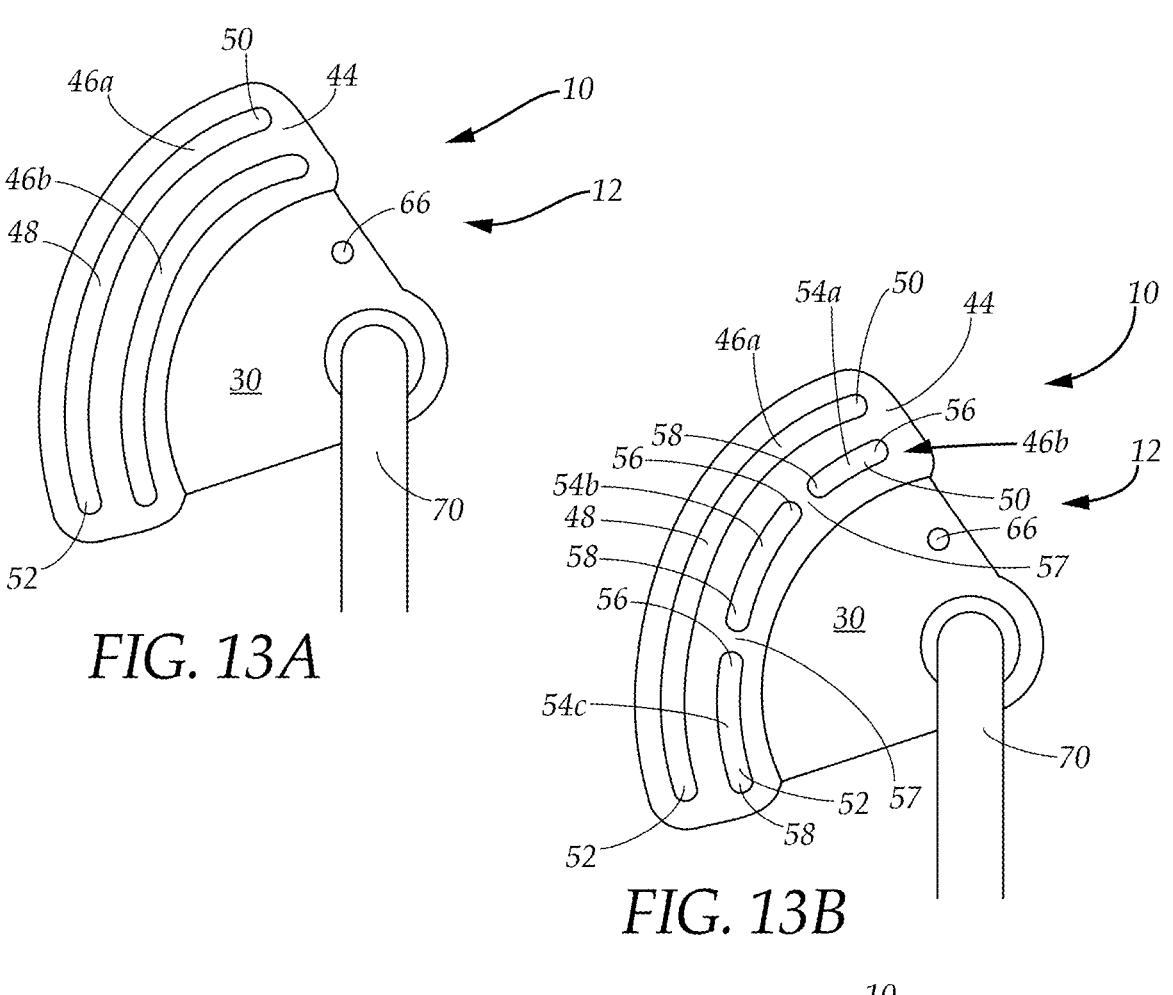
FIG. 13A
FIG. 13B
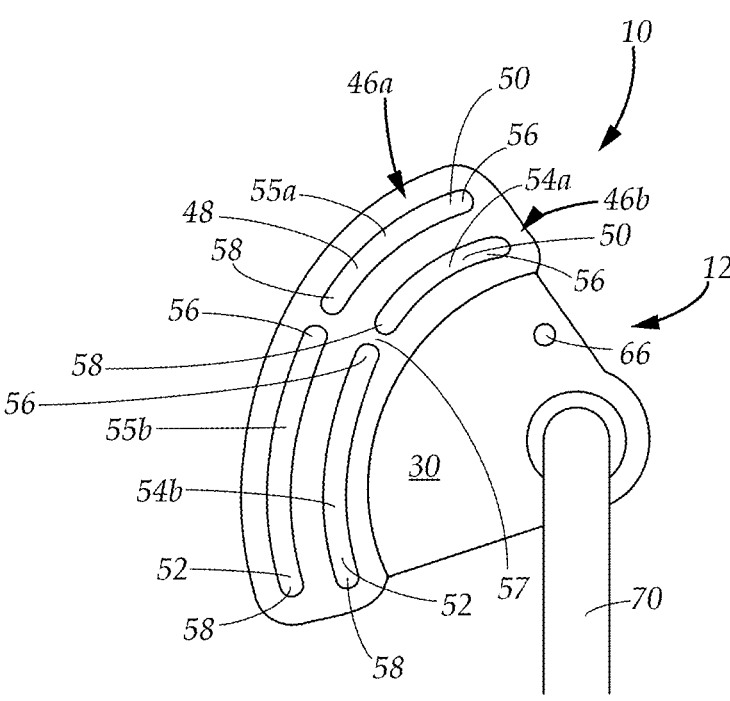
FIG. 13C

BICYCLE STABILIZING ASSEMBLY

CROSS REFERENCE TO RELATED APPLICATIONS

The present application is a conversion of U.S. Provisional Patent Application No. 63/491,509, filed Mar. 21, 2023, which is relied upon and incorporated herein by reference in its entirety. The entire disclosure of any publication or patent document mentioned herein is entirely incorporated by refence.

TECHNICAL FIELD

The present disclosure relates generally to bicycle accessories. More particularly, the present disclosure relates to a universal stabilizing assembly designed to accommodate a wide range of bicycle frames.

BACKGROUND

Bicycles have long been a popular mode of transportation and recreational activity. They come in various designs, each with unique frame geometries and configurations. One common challenge faced by novice cyclists, children, and individuals with balance difficulties is the need for additional stability during their learning or training process. Training wheels have traditionally been used to address this issue. However, existing training wheel systems are often limited by their compatibility with specific bicycle frame designs, particularly the angle formed between the seat stay and the chain stay.

The angle between the seat stay and the chain stay on a bicycle frame varies from model to model, making it challenging to provide a one-size-fits-all solution for stabilizing assemblies. Many existing stabilizing assemblies are designed to work with specific bicycle frames, rendering them incompatible with a broad range of bicycles. This limitation can be frustrating for consumers who own multiple bicycles or have bicycles with unique frame designs.

Furthermore, achieving the ideal orientation of training wheels to ensure effective stability can be difficult with conventional stabilizing assemblies. Cyclists may have different preferences or requirements for the position and height of the training wheels, which is not always accommodated by existing designs.

Therefore, there is a need for a versatile, user-friendly bicycle stabilizing assembly configured to adapt to various bicycle frame designs and to provide multiple adjustment options for wheel orientation and height. Additionally, what is needed is a bicycle stabilizing assembly that is simple to manufacture and inexpensive to ship. Ideally, such a bicycle stabilizing assembly would promote safety, confidence, and ease of use, thereby contributing to a more enjoyable cycling experience for riders of all skill levels.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

According to one aspect of the present disclosure, a bicycle stabilizing assembly includes a mounting bracket configured to be attached to a frame of a bicycle. The mounting bracket includes a front surface, a back surface, a plate portion, a track portion, and a stabilizing arm.

The plate portion includes a bottom edge, a side edge, and a top edge extending between the bottom edge and the side edge. In some embodiments, the plate portion further includes a socket disposed substantially adjacent to the bottom edge. The track portion is substantially planar and extends along the top edge such that the plate portion is substantially parallel to the track portion. The track portion includes one or more arcuate channels extending between the front surface and the back surface. Each arcuate channel includes an arc extending between a first end and a second end. The arcuate channel is configured to slidably engage a retaining bracket along the arc.

The stabilizing arm includes an elongate bar extending between a distal end and a proximal end. The proximal end is configured to rotatably engage the socket such that an orientation of the stabilizing arm with respect to the mounting bracket is adjustable. The elongate bar is configured to retain a training wheel at a desired height relative to the distal end.

In some embodiments, the elongate bar includes multiple apertures disposed vertically therein. Each of the apertures is configured to adjustably retain the training wheel at a desired height with respect to the stabilizing arm. In some embodiments, the socket includes a gear element configured to selectively engage the proximal end of the stabilizing arm to allow the stabilizing arm to be oriented as desired with respect to the mounting bracket.

In some embodiments, the retaining bracket includes at least one end configured to extend through at least a portion of the arcuate channel to selectively couple the frame to the mounting bracket at a desired position. In certain embodiments, a securing element is configured to selectively engage the end to secure the frame to the mounting bracket at the desired position.

In some embodiments, the frame extends along a longitudinal axis and includes a chain stay element disposed substantially parallel to the longitudinal axis and a seat stay element. An elongate ledge may be disposed between top edge of the plate portion and a lower edge of the track portion. In some embodiments, the elongate ledge is substantially planar and extends substantially perpendicularly between the plate portion and the track portion.

In some embodiments, the arcuate channel includes a first arcuate channel disposed substantially parallel to a second arcuate channel. In these and other embodiments, the arcuate channel my include multiple track sections disposed consecutively along the arc. Each of the track sections may include a first terminus and a second terminus.

According to another aspect of the present disclosure, a bicycle stabilizing system is disclosed. The bicycle stabilizing system includes a bicycle stabilizing assembly coupled to the chain stay element and/or the seat stay element of a frame of a bicycle. The bicycle stabilizing assembly includes a mounting bracket having a front surface and a back surface. The mounting bracket includes a plate portion and a track portion. The plate portion includes a bottom edge, a side edge, and a top edge extending between the bottom edge and the side edge, The plate portion further includes a socket disposed substantially adjacent to the bottom edge.

The track portion is substantially planar and extends along the top edge such that the plate portion is disposed substantially parallel to the track portion. The track portion includes one or more arcuate channels disposed therethrough. The arcuate channel includes an arc extending between a first end and a second end.

The bicycle stabilizing assembly further includes a stabilizing arm, a retaining bracket, and a training wheel. The stabilizing arm includes a distal end, a proximal end, and an elongate bar therebetween. The proximal end is configured to rotatably engage the socket such that an orientation of the stabilizing arm with respect to the mounting bracket is selectively adjustable.

The retaining bracket is coupled to the chain stay element and/or the seat stay element. The retaining bracket is slidably engaged with the arc such that the mounting bracket is coupled to the frame at a desired position. The training wheel is adjustably coupled to the elongate bar to permit a height of the training wheel relative to the distal end to be selectively adjusted.

In some embodiments, the elongate bar includes multiple apertures disposed therein in a vertical configuration. In some embodiments, an attachment element is configured to selectively engage the training wheel and one of the apertures to couple the training wheel to the elongate bar.

In some embodiments, the mounting bracket includes an auxiliary connection element disposed in the plate portion and configured to couple an auxiliary vehicle and/or auxiliary device to the bicycle frame.

In certain embodiments, the socket includes a gear element configured to selectively engage the proximal end of the stabilizing arm to orient a position of the stabilizing arm with respect to the mounting bracket. In some embodiments, one or more securing elements is configured to secure a position of the proximal end relative to the gear element.

In some embodiments, the retaining bracket includes a first retaining bracket coupled to the chain stay element and a second retaining bracket coupled to the seat stay element. The first retaining bracket may be coupled to a first arcuate channel and the second retaining bracket may be coupled to a second arcuate channel.

BRIEF DESCRIPTION OF THE DRAWINGS

In the drawings, like elements are depicted by like reference numerals. The drawings are briefly described as follows.

FIG. 13A is a close-up side view of the mounting bracket and arcuate tracks in accordance with certain embodiments of the present disclosure;

FIG. 13B is close-up side view of the mounting bracket having multiple arcuate tracks in accordance with some embodiments of the present disclosure;

FIG. 13C is close-up side view the mounting bracket having multiple arcuate tracks in accordance with alternative embodiments of the disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

As discussed above, many novice cyclists, children, and individuals with balance difficulties benefit from utilizing training wheels to provide additional stability during their learning process. Currently training wheel systems, however, are not universally compatible with the wide variety of sizes and styles of bicycle frames available. The bicycle stabilizing assembly and system disclosed herein represents a significant advancement in the field of bicycle accessories by addressing this and other issues.

As used herein, the term "distal" refers to a location, position, and/or direction away from the bicycle frame or point of attachment or origin. Similarly, the term "proximal" refers to a location, position, and/or direction near to the bicycle frame or point of attachment or origin. The term "bicycle" refers to any motorized or non-motorized vehicle having a frame coupled to two wheels in tandem, handlebars for steering, and a saddle seat. A bicycle may or may not include pedals configured to propel or mobilize the bicycle along a surface.

Figure 1:
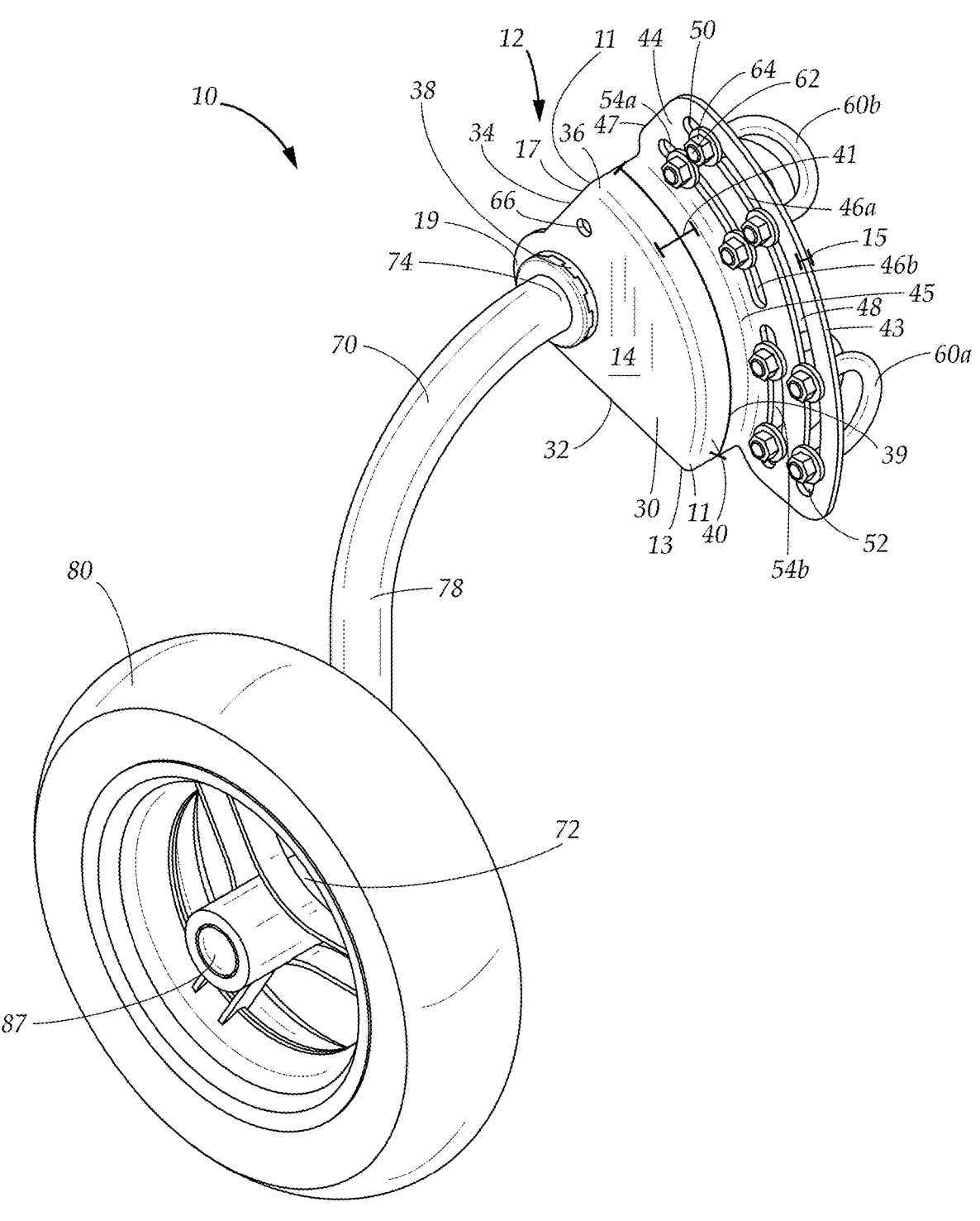
FIG. 1 is a front perspective view of the bicycle stabilizing assembly having a mounting bracket, a stabilizing arm, and a training wheel in accordance with one embodiment of the present disclosure.
Figure 2:
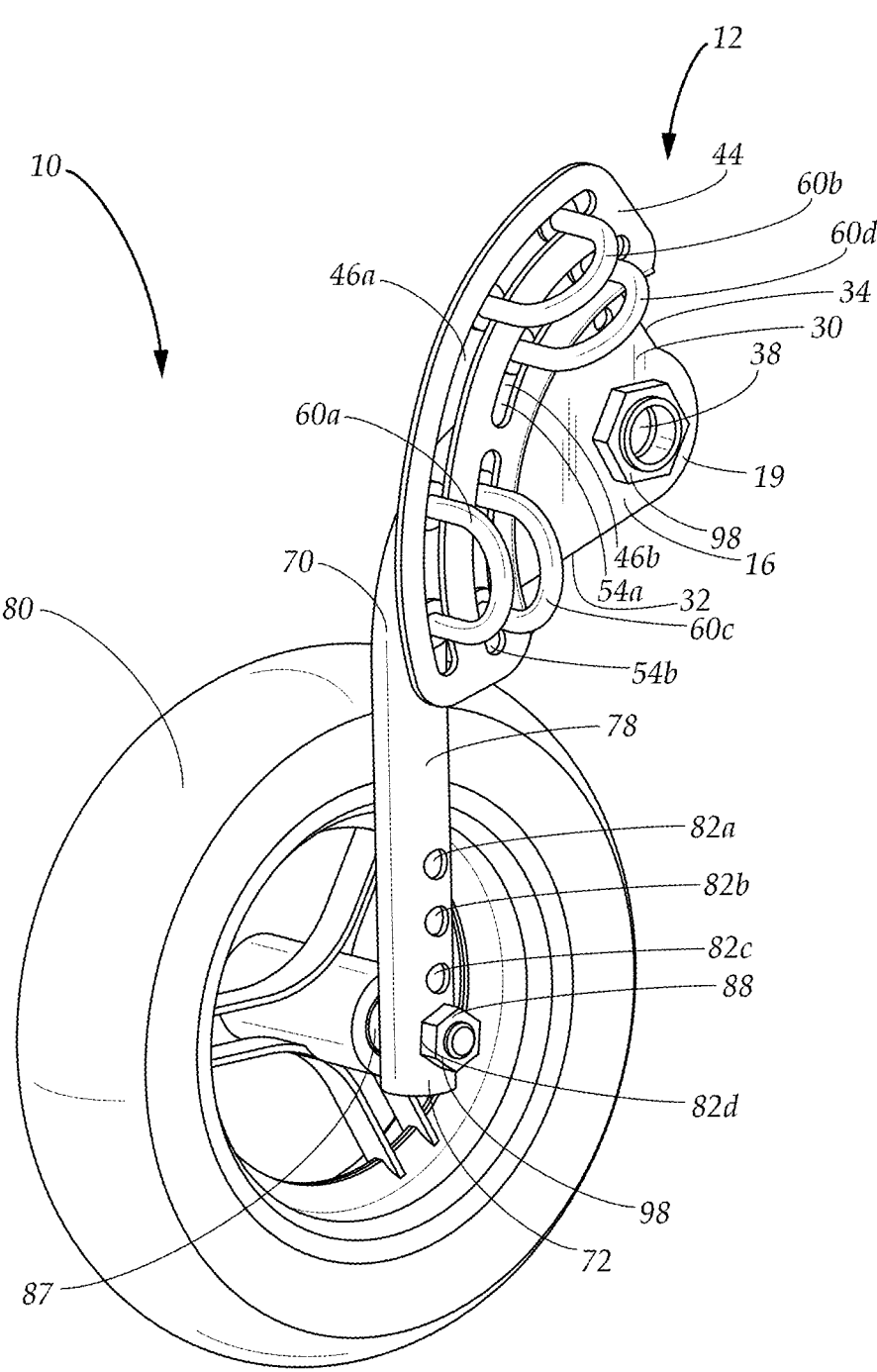
FIG. 2 is a rear perspective view of the bicycle stabilizing assembly of FIG. 1.

Referring now to FIGS. 1 and 2, a bicycle stabilizing assembly 10 in accordance with various embodiments is configured to be universally attachable such that it may be used to facilitate stabilizing a bicycle of any size, type, and/or style. Various components of the bicycle stabilizing assembly 10 may be fabricated and/or machined from a rigid, durable metal such as steel, titanium, aluminum, magnesium, carbon fiber, and/or alloys and/or composites thereof. In some embodiments, one or more components of the bicycle stabilizing assembly 10 may include rigid, durable metal, plastic, or other suitable material including nylon, polycarbonate, carbon-reinforced plastic, carbon fiber, and/or the like. Some embodiments of the bicycle stabilizing assembly 10 include a training wheel 80 that includes metal, plastic, rubber, a combination thereof, and/or any other suitable material.

In some embodiments, the bicycle stabilizing assembly 10 includes a mounting bracket 12 and a stabilizing arm 70 configured to couple to a training wheel 80. The mounting bracket 12 may include a front surface 14, a back surface 16, and a thickness 15 therebetween. In some embodiments, the thickness 15 is in a range between about ¹⁄₂₀ inch and about ¼ inch. In some embodiments, the front surface 14 and the back surface 16 are substantially planar and/or substantially smooth.

In certain embodiments, the mounting bracket 12 includes a plate portion 30 and a track portion 44. The plate portion 30 may include a bottom edge 32, a side edge 34, and a top edge 36 that extends between the bottom edge 32 and the side edge 34. In some embodiments, the bottom edge 32 and the side edge 34 are substantially straight along their lengths. The bottom edge 32 may include a length in a range between about 2" and about 6". The side edge 34 may include a length between about 2" and about 7".

In some embodiments, the bottom edge 32 and the side edge 34 form a corner 19 having an angle in a range between about 60° and about 120°. The corner 19 may be disposed substantially opposite and spaced apart from the top edge 36. In some embodiments, the side edge 34 extends substantially perpendicularly from the bottom edge 32 to form a corner 19 approximating a right angle. In some embodiments, the corner 19 is curved or rounded to avoid inadvertently catching on skin or clothing of a user.

In some embodiments, the top edge 36 includes a convex curve or arc extending from a top end 17 of the side edge 34 to the lateral end 13 of the bottom edge 32. In other embodiments, the top edge 36 may be substantially straight between the top end 17 of the side edge 34 and the lateral end 13 of the bottom edge 32. In these and other embodiments, a point 11 may be defined by the top edge 36 meeting the side edge 34 and/or bottom edge 32. In some embodiments, the point 11 may be curved to avoid interfering with or injuring a user.

Figure 14:
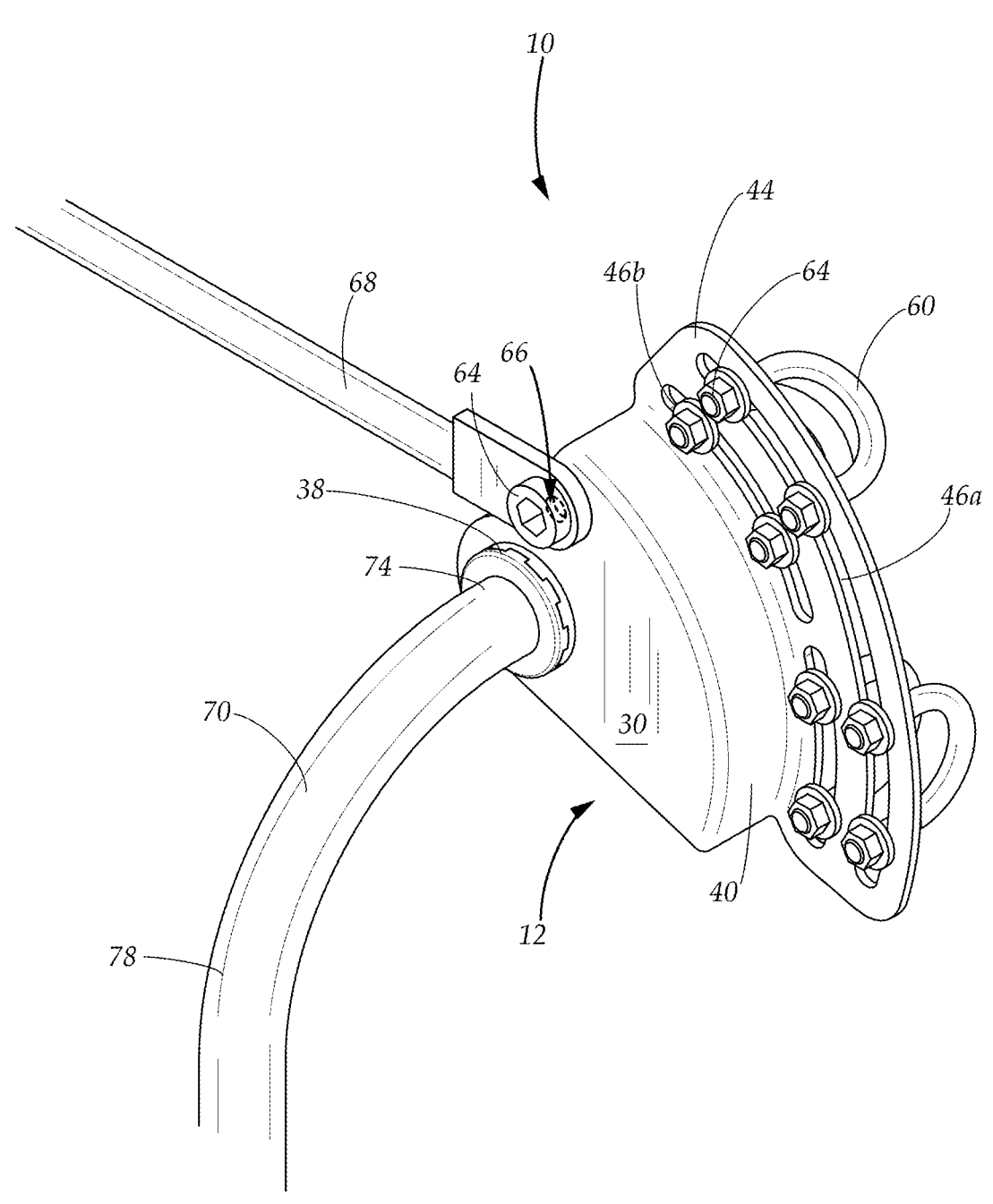
FIG. 14 is a close-up side view of the mounting bracket illustrating an auxiliary vehicle coupled to the mounting bracket via the auxiliary connection element in accordance with some embodiments of the present disclosure.

Referring now to FIG. 14, while still referring to FIGS. 1 and 2, in some embodiments, the plate portion 30 of the mounting bracket 12 includes an auxiliary connection element 66 configured to selectively couple to an auxiliary connector 68 of an auxiliary vehicle, trailer, and/or other suitable auxiliary device or feature. In this manner, the mounting bracket 12 may also be used to securely couple an auxiliary vehicle or other auxiliary device to a bicycle frame (not shown).

In certain embodiments, the auxiliary connection element 66 includes a hole, slot, groove, and/or other suitable feature extending at least partially through the plate portion 30 between the front surface 14 and the back surface 16. The auxiliary connection element 66 may be configured to selectively engage at least a portion of an auxiliary connector 68 integrated with or coupled to the auxiliary vehicle (not shown) or other auxiliary device. In some embodiments, the auxiliary connection element 66 is configured to engage or receive at least a portion of the auxiliary connector 68. In other embodiments, a securing element 64 is configured to extend through the auxiliary connector 68 as well as through the auxiliary connection element 66 to secure the auxiliary vehicle (not shown) or other auxiliary device to the bicycle stabilizing assembly 10. In this manner, the auxiliary connection element 66 may securely couple the auxiliary vehicle or other auxiliary device to the mounting bracket 12, as well as to a bicycle frame 20 (shown in FIG. 5).

In some embodiments, the track portion 44 is substantially planar and extends along the top edge 36 such that the plate portion 30 is substantially parallel to the track portion 44. In certain embodiments, the track portion 44 includes a lower edge 45 having a contour or shape substantially matching that of the top edge 36 of the plate portion 30. Similarly, the track portion 44 may include an upper edge 43 substantially mirroring the contour or shape of the lower edge 45 and/or the top edge 36 of the plate portion 30. In these and other embodiments, the track portion 44 may include a side 47 extending between the lower edge 45 and the upper edge 43. A length of the side 47 may define a width of the track portion 44. In some embodiments, the side 47 includes a length between about 1" and about 3".

In some embodiments, the track portion 44 includes one or more arcuate channels 46a, 46b extending through the track portion 44 between the front surface 14 and the back surface 16. Each arcuate channel 46a, 46b may include an arc 48 extending between a first end 50 and a second end 52. The arcuate channel 46a, 46b may include dimensions configured to slidably engage one or more retaining brackets 60a-60d along the arc 48. For example, in certain embodiments, each of the retaining brackets 60a-60d may include at least one end 62 configured to extend through the arcuate channel 46a, 46b such that a portion of the retaining bracket 60a-60d is retained within the arcuate channel 46a, 46b and is slidable along the arc 48.

In one embodiment, for example, at least one of the retaining brackets 60a-60d includes a U-bracket configured such that the U-shaped portion of each retaining bracket 60a-60d is retained adjacent to the back surface 16 of the arcuate channel 46a, 46b and the ends 62 of each retaining bracket 60a-60d is retained adjacent to the front surface 14 of the arcuate channel 46a, 46b. In some embodiments, the U-shaped portion of each of the retaining brackets 60a-60d is configured to surround a portion of the frame 20 (shown in FIG. 5) adjacent to the back surface 16 such that the ends 62 of the retaining bracket 60a-60d extend through the arcuate channel 46a, 46b to the front surface 14. A securing element 64 may engage one or more ends 62 of the retaining bracket 60a-60d adjacent to the front surface 14, thereby securing a position of the retaining bracket 60a-60d along the arcuate channel 46a, 46b. Engaging the securing element 64 to the ends 62 in this manner may also secure the mounting bracket 12 to the frame 20 (shown in FIG. 5).

In one embodiment, the track portion 44 includes a first arcuate channel 46a disposed adjacent and substantially parallel to a second arcuate channel 46b. In some embodiments, the first arcuate channel 46a and the second arcuate channel 46b may include identical or substantially similar shapes and/or sizes. In certain embodiments, the first arcuate channel 46a is disposed above and spaced apart from the second arcuate channel 46b by a distance sufficient to accommodate at least one securing element 64 engaged with an end 62 of a retaining bracket 60a-60d. In some embodiments, the first arcuate channel 46a is disposed adjacent to the upper edge 43 of the track portion 44 and the second arcuate channel 46b is disposed adjacent to the lower edge 45 of the track portion 44. In these and other embodiments, the shape and/or contour of the track portion 44 substantially mirrors the shape of the arcs 48 of the arcuate channels 46a, 46b. In other embodiments, the shape or arc 48 of each of the arcuate channels 46a, 46b may be independent of each other and/or independent of the shape of the track portion 44.

In some embodiments, the plate portion 30 and the track portion 44 are monolithically formed as a single unit. In other embodiments, the plate portion 30 is coupled to the track portion 44 via bonding, welding, bolts, screws, rivets, and/or any other suitable mechanical fastener or mechanical fastening technique.

In some embodiments, an elongate ledge 40 is disposed between the top edge 36 of the plate portion 30 and the lower edge 45 of the track portion 44. The elongate ledge 40 may be integrally formed with the plate portion 30 and/or the track portion 44. In other embodiments, the elongate ledge 40 may be coupled to the plate portion 30 and/or the track portion 44 via any suitable mechanical fastener or fastening technique including bonding, welding, screws, bolts, rivets, adhesives, a combination thereof, and/or the like.

In some embodiments, the elongate ledge 40 is substantially planar and is coupled to the top edge 36 of the plate portion 30 and/or the lower edge 45 of the track portion 44 such that a width 41 of the elongate ledge 40 extends substantially perpendicularly between the plate portion 30 and the track portion 44. The width 41 of the elongate ledge 40 may be between about 0.5" and about 2.5". In this manner, the front surface 14 of the plate portion 30 and the front surface 14 of the track portion 44 may be situated substantially parallel to and offset from each other. In these and other embodiments, the back surface 16 of the plate portion 30 and the back surface 16 of the track portion 44 may also be situated substantially parallel to and offset from each other.

In some embodiments, the elongate ledge 40 includes a length 39 substantially identical to the top edge 36 of the plate portion 30 and/or the lower edge 45 of the track portion 44. The elongate ledge 40 may thus be coupled to and extend along the top edge 36 of the plate portion 30 and the lower edge 45 of the track portion 44. In some embodiments, the length 39 of the elongate ledge 40 may be divided such that each portion or segment of the elongate ledge 40 is separated from each other portion or segment along the length 39.

In some embodiments, a socket 38 is integrated into the plate portion 30 and extends through the plate portion 30 between the front surface 14 and the back surface 16. In some embodiments, the socket 38 is disposed substantially adjacent to the corner 19 and/or the bottom edge 32. In other words, the socket 38 may be disposed substantially opposite and spaced apart from the top edge 36 of the plate portion 30.

The socket 38 may have a size and shape configured to engage at least a portion of the stabilizing arm 70. In some embodiments, the socket 38 may be configured to selectively engage a proximal end 74 of the stabilizing arm 70 to thereby secure the stabilizing arm 70 to the mounting bracket 12 in a desired orientation. In some embodiments, the proximal end 72 may be configured to extend at least partially through the socket 38. In these and other embodiments, a securing element 98 may be coupled to the proximal end 74 through the socket 38 such that the securing element 98 is retained against the back surface 16 of the plate portion 30.

In some embodiments, the stabilizing arm 70 includes an elongate bar 78 extending between a proximal end 74 and a distal end 72. The elongate bar 78 may be substantially cylindrical or may include any other suitable regular or irregular cross-sectional shape. In some embodiments, the elongate bar 78 includes one or more convex or concave curves or is substantially S-shaped between the proximal end 74 and the distal end 72. In these and other embodiments, the proximal end 74 may be curved or angled toward the socket 38 of the plate portion 30 and the distal end 72 may be curved or angled outwardly in a substantially opposite direction to facilitate coupling a training wheel 80 to the stabilizing arm 70 such that the training wheel 80 may be maintained at a desired position and distance from the bicycle (not shown).

Figure 5:
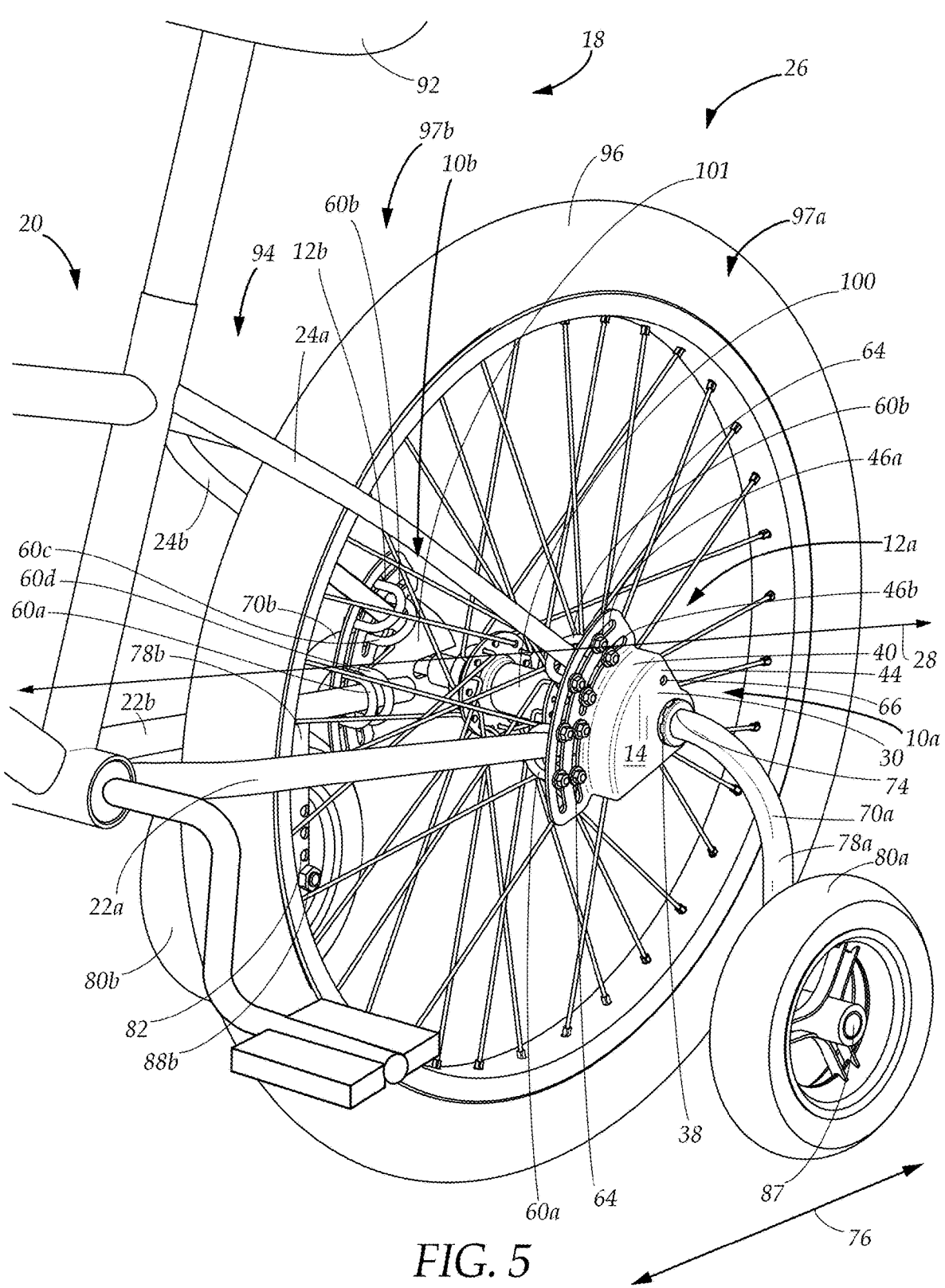
FIG. 5 is a side perspective view of the bicycle stabilizing system secured to a bicycle, illustrating the mounting bracket coupled to the chain stay and the seat stay of the bicycle frame in accordance with various embodiments of the present disclosure.

Referring now to FIG. 5, while still referring to FIGS. 1 and 2, in some embodiments, an axle 87 is coupled to and extends through the training wheel 80 such that the axle 87 also couples the training wheel 80 to the distal end 72 of the stabilizing arm 70. In some embodiments, at least a portion of the axle 87 extends through and/or couples to the distal end 72 of the stabilizing arm 70. A suitable attachment element 88, such as a bolt, a screw, and/or the like, may be attached to the portion of the axle 87 through the stabilizing arm 70. The attachment element 88 may be configured to allow rotation of the training wheel 80 about the axle 87 in a direction substantially parallel to the direction of travel 76 of the bicycle 18.

In one embodiment, for example, the axle 87 extends substantially perpendicularly from and/or through the training wheel 80 such that the training wheel 80 rotates about the axle 87 in a direction parallel to a rear wheel 96 of the bicycle 18. The distal end 72 of the stabilizing arm 70 may angle outwardly from the elongate bar 78 such that distal end 72 of the stabilizing arm 70 is substantially aligned with the axle 87. The axle 87 may thus retain the training wheel 80 in an upright position substantially aligned with and parallel to the rear wheel 96 of the bicycle 18, while the elongate bar 78 may effectively distance the training wheel 80 from the bicycle 18 and rear wheel 96 to assist with stabilization when the bicycle 18 is in motion.

Referring now to FIGS. 3A-3C and 13A-13C, in some embodiments, the track portion 44 includes more than one arcuate channel 46a, 46b. In other embodiments, the track portion 44 includes a single arcuate channel 46a, 46b. In some embodiments, a first arcuate channel 46a is disposed adjacent to and substantially parallel to a second arcuate channel 46b. In these and other embodiments, the arcuate channel 46a, 46b may be continuous between the first end 50 and the second end 52 or may be segmented to include more than one track section 54a-54c. In some embodiments, each track section 54a-54c is separated from each other track section 54a-54c via a pathway 57. In some embodiments, multiple track sections 54a-54c are disposed between the first end 50 and the second end 52 in succession.

In certain embodiments, each of segments of the arcuate channel 46a, 46b or track sections 54a-54c includes a first terminus 56 and a second terminus 58. The track sections 54a-54c may be arranged successively along the arc 48 of a corresponding arcuate channel 46a, 46b such that the second terminus 58 of a first track section 54a is disposed adjacent to a first terminus 56 of a second track section 54b. In some embodiments, the first terminus 56 of a first track section 54a corresponds to the first end 50 of the corresponding arcuate channel 46a, 46b. Similarly, the second terminus 58 of a second track section 54b may correspond to the second end 52 of the corresponding arcuate channel 46a, 46b. Of course, in other embodiments, more than two track sections 54a-54c may be successively disposed along a single arcuate channel 46a, 46b such that the second terminus 58 of the second track section 54b is not the second end 52 of the arcuate channel 46a, 46b.

Figures 3A, 3B, 3C:
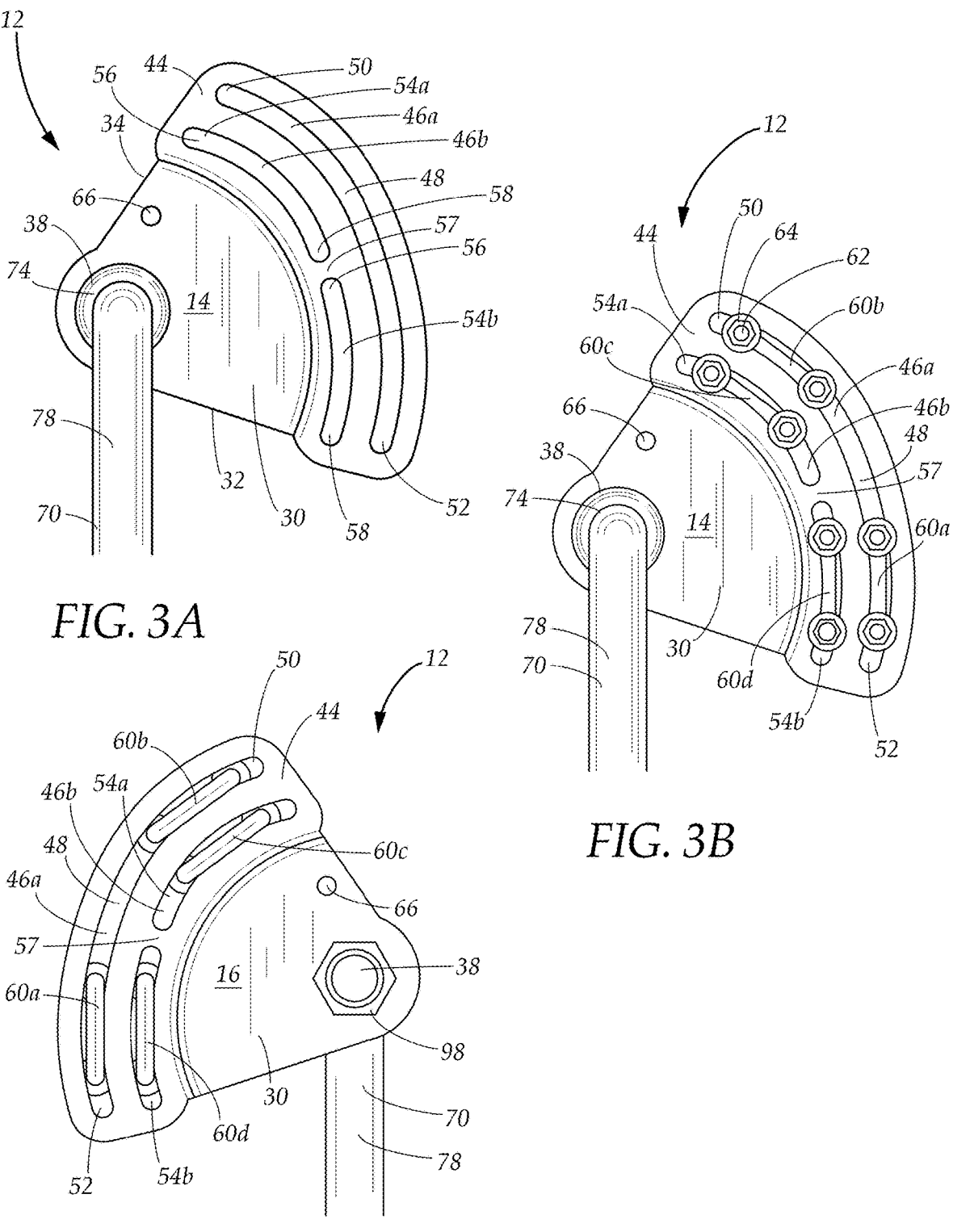
FIG. 3A is a close-up front view of the mounting bracket having multiple arcuate tracks and a stabilizing arm in accordance with some embodiments of the present disclosure.
FIG. 3B is a close-up front view of the mounting bracket and the stabilizing arm, illustrating multiple retaining brackets coupled to the arcuate tracks in accordance with some embodiments of the present disclosure.
FIG. 3C is a close-up rear view of the mounting bracket, stabilizing arm, and retaining brackets of FIG. 3A in accordance with some embodiments of the present disclosure.
Figure 4:
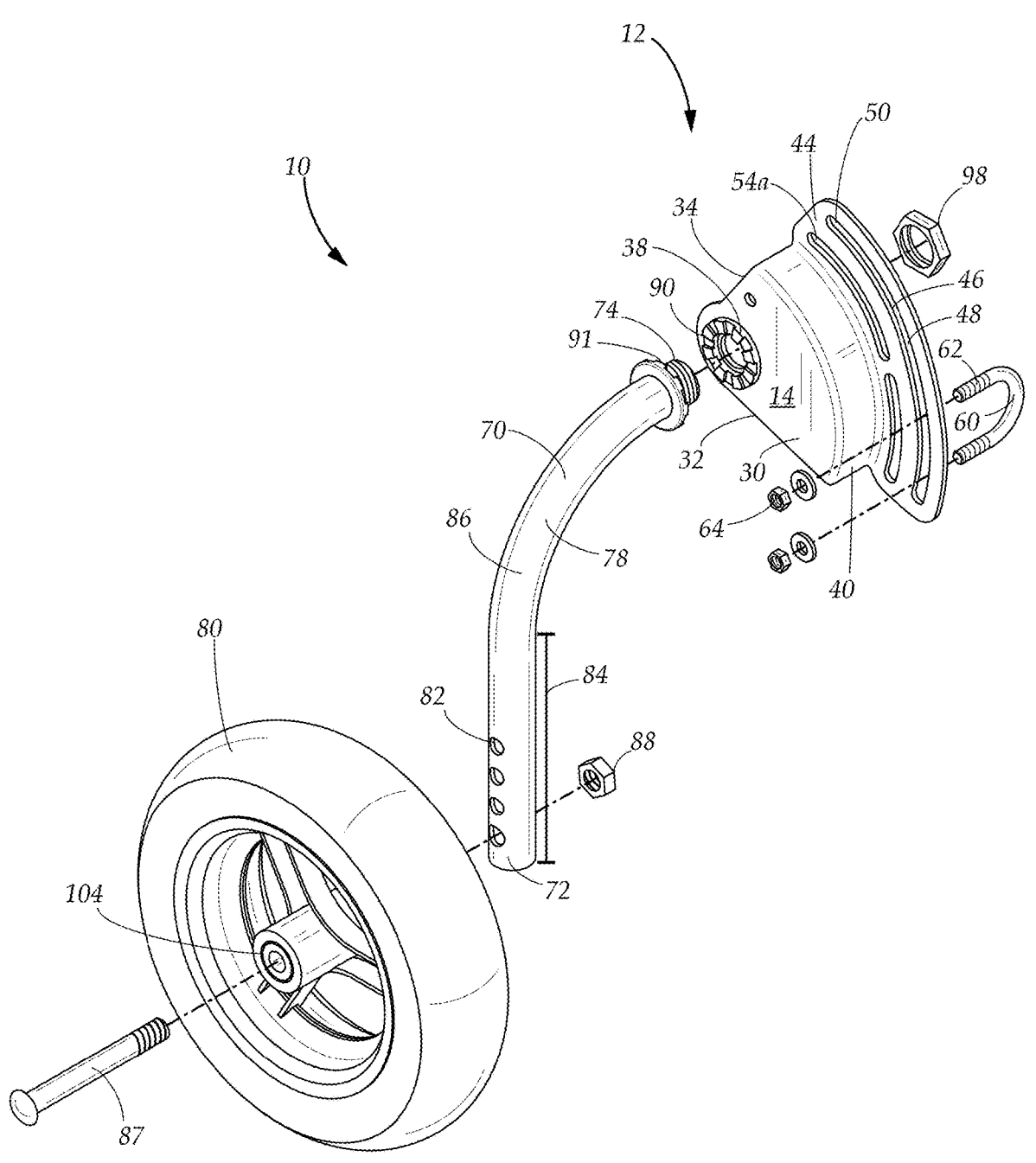
FIG. 4 is an exploded perspective view of the bicycle stabilizing assembly, illustrating one manner in which the mounting bracket, the stabilizing arm, and the training wheel separate and engage in accordance with certain embodiments of the present disclosure.

In some embodiments, one or more retaining brackets 60a-60d may be coupled to one or more of the arcuate channels 46a, 46b and/or track sections 54a-54c. For example, as shown in FIGS. 3B and 3C, a first retaining bracket 60a and a second retaining bracket 60b may be coupled to and slidable along the first arcuate channel 46a, while a third retaining bracket 60c and a fourth retaining bracket 60d may be coupled to and slidable along the second arcuate channel 46b. Of course, any number of retaining brackets 60a-60d and arcuate channels 46a, 46b are contemplated herein, and any number of retaining brackets 60a-60d may be distributed between one or more of the arcuate channels 46a, 46b in any desired number, position, or orientation.

Referring now to FIG. 5 while also referring to FIGS. 3A-3C and 13A-13C, in some embodiments, the first and second arcuate channels 46a, 46b are substantially parallel to one another such that the arcs 48 of both arcuate channels 46a, 46b are substantially aligned. In these and other embodiments, the arcs 48 of each of the arcuate channels 46a, 46b may include dimensions sufficient to universally accommodate and align with a chain stay element 22a, 22b and/or a seat stay element 24a, 24b of any frame 20.

Similarly, the retaining brackets 60a-60d may likewise include dimensions sufficient to universally accommodate and attach to a chain stay element 22a, 22b and/or seat stay element 24a, 24b of any bicycle frame 20. In these and other embodiments, each of the retaining brackets 60a-60d may be configured to surround at least a portion of the chain stay element 22a, 22b or the seat stay element 24a, 24b. Each retaining bracket 60a-60d may be inserted through the arc 48 of an arcuate channel 46a, 46b aligned with the position of the corresponding chain stay element 22a, 22b or seat stay element 24a, 24b. A distance between adjacent retaining brackets 60a-60d and an orientation of the individual retaining brackets 60a-60d relative to its corresponding chain stay element 22a, 22b or the seat stay element 24a, 24b may arc 48 varied as needed by sliding the retaining bracket 60a-60d along the arc 48 48 as needed to universally accommodate any frame 20.

In some embodiments, for example, the first retaining bracket 60a and the third retaining bracket 60c substantially align with and are configured to couple to a seat stay element 24a, 24b. Similarly, the second retaining bracket 60b and the fourth retaining bracket 60d may substantially align with and be configured to couple to a chain stay element 22a, 22b. As shown, each of the retaining brackets 60a-60d may be U-brackets configured to couple to the seat stay element 24a, 24b and/or the chain stay element 22a, 22b along the back surface 16 of the mounting bracket 12. Of course, in other embodiments, the retaining brackets 60a-60d include any suitable type of bracket and need not be identical to one another.

At least one end 62 of each retaining bracket 60a-60d may be secured through the corresponding arcuate channel 46a, 46b on the front surface 14 of the mounting bracket 12. In some embodiments, a securing element 64 such as a washer and/or nut may be coupled to the end 62 via corresponding threads, or via any other suitable fastening device or technique.

Similarly, in some embodiments, the proximal end 74 of the stabilizing arm 70 extends through the socket 38 and is secured on the back surface 16 of the mounting bracket 12 via a securing element 98. In this manner, the stabilizing arm 70 may be retained substantially adjacent to the front surface 14 of the mounting bracket 12. In some embodiments, the securing element 98 may include a nut, a bolt, a rivet, a grommet, welding, and/or any other suitable mechanical fastening device or mechanism to couple the proximal end 74 of the stabilizing arm 70 to the mounting bracket 12 via the socket 38.

Referring now to FIGS. 4, 9A-9B, and 10A-10B, in some embodiments, the stabilizing arm 70 includes an elongate bar 78 extending between a distal end 72 and a proximal end 74. In some embodiments, the proximal end 74 includes threads 75 and/or another suitable mechanical securing feature configured to engage a securing element 98. In some embodiments, the proximal end 74 is configured to rotatably engage the socket 38 such that an orientation of the stabilizing arm 70 with respect to the mounting bracket 60 may be selectively adjusted.

In some embodiments, the shape of the socket 38 is substantially identical to a cross-sectional shape of at least a portion of the proximal end 74. The socket 38 may include dimensions at least slightly greater than dimensions of the proximal end 74 such that at least a portion of the proximal end 74 may be received into the socket 38. In one embodiment, for example, the socket 38 is substantially circular and the proximal end 74 is substantially cylindrical such that the proximal end 74 is configured to rotate within the socket 38. In other embodiments, the shape of the socket 38 and the cross-sectional shape of the proximal end 74 are hexagonal, octagonal, or another suitable polygonal shape.

The proximal end 74 of the stabilizing arm 70 may be introduced at the front surface 14 of the mounting bracket 12 and may extend through the socket 38 such that at least a portion of the proximal end 74 is accessible on the back surface 16 of the mounting bracket 12. In this manner, the securing element 98 may be mounted to the proximal end 74 such that the securing element 98 is disposed adjacent to the back surface 16 of the plate portion 30.

Figures 9A, 9B:
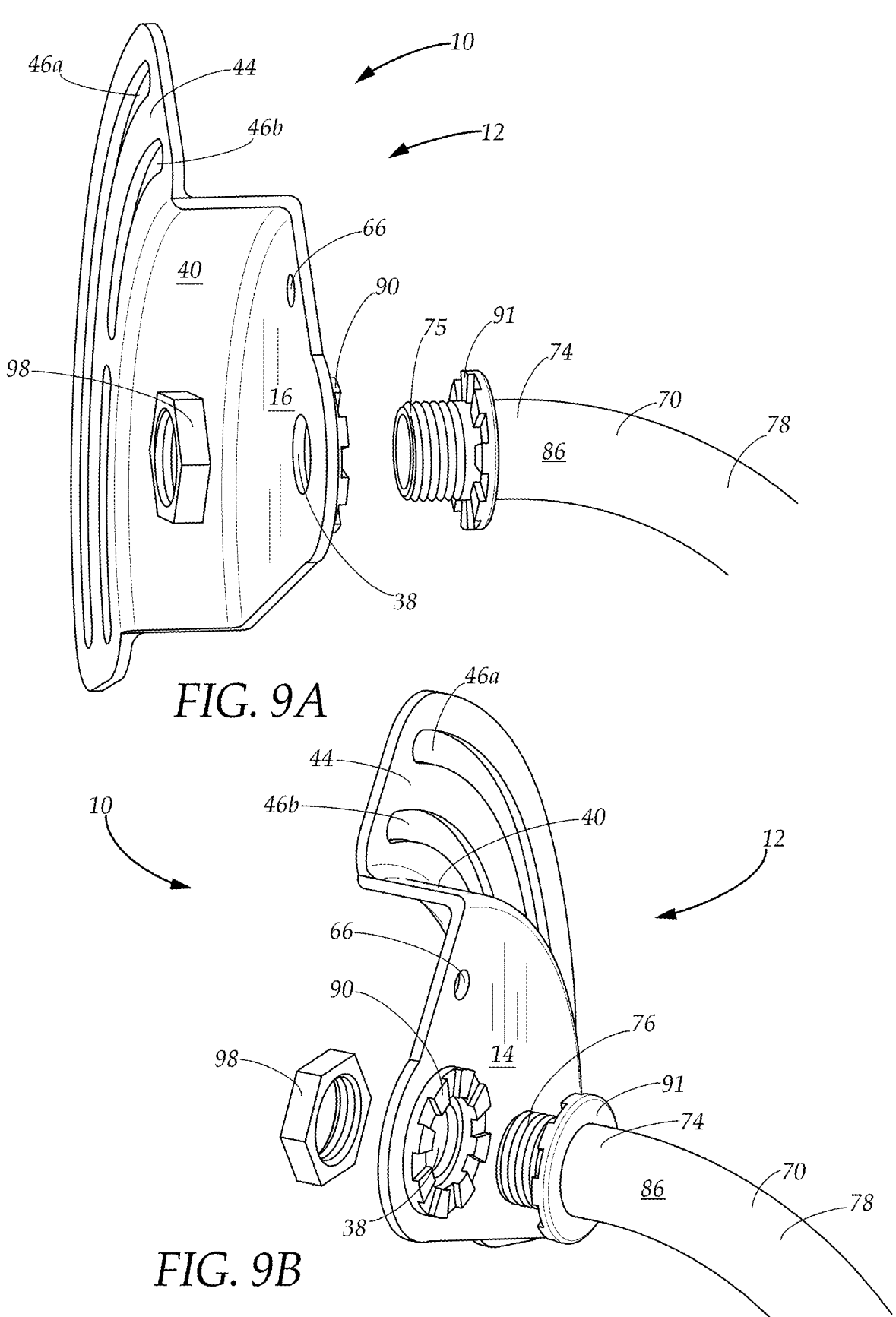
FIG. 9A is a close-up partial exploded rear perspective view of the stabilizing arm and the socket of the mounting bracket, illustrating one embodiment of the socket and one manner in which the proximal end of the stabilizing arm aligns with the socket to engage the socket in accordance with some embodiments of the present disclosure.
FIG. 9B is a close-up partial exploded front perspective view of the stabilizing arm and the socket of FIG. 9A in accordance with one embodiment of the present disclosure.

In some embodiments, as shown in FIGS. 9A and 9B, the socket 38 includes a gear element 90 mounted to the socket 38 and/or to the front surface 14 of the mounting bracket 12. The gear element 90 may be configured to selectively engage a corresponding gear element 91 integrated with or coupled to the proximal end 74 of the stabilizing arm 70. In some embodiments, the corresponding gear element 91 is substantially planar and extends outwardly in a substantially perpendicular direction relative to the elongate bar 78. In one embodiment the corresponding gear element 91 is integrated with an outer surface 86 of the elongate bar 78 near the proximal end 74. In these and other embodiments, the corresponding gear element 91 may substantially circumscribe and extends substantially radially from the outer surface 86 of the elongate bar 78.

Figures 10A, 10B:
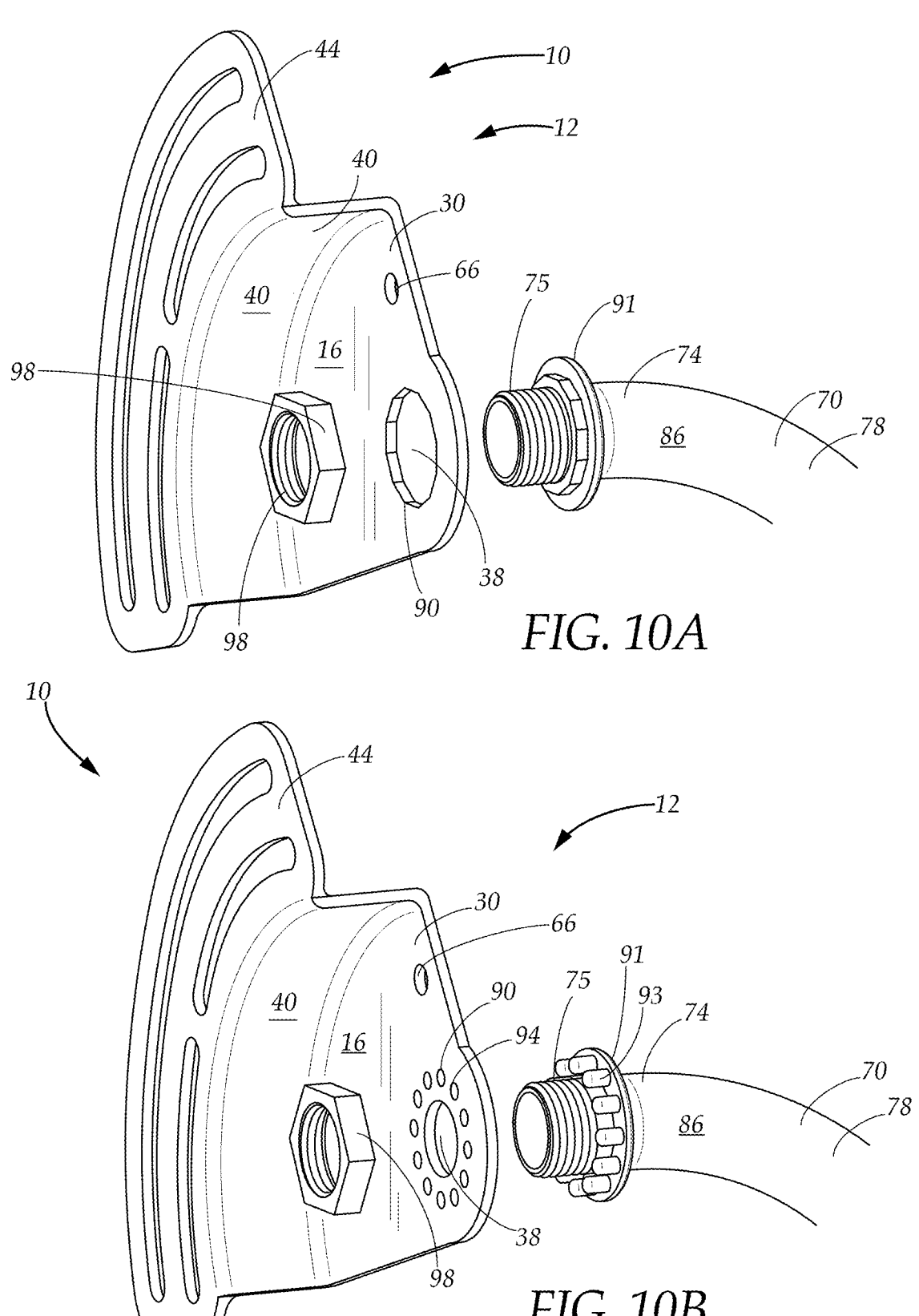
FIG. 10A is close-up partial exploded rear perspective view of the stabilizing arm and the socket of the mounting bracket, illustrating another embodiment of the socket and one manner in which the proximal end of the stabilizing arm aligns with the socket to engage the socket in accordance with some embodiments of the present disclosure.
FIG. 10B is close-up partial exploded rear perspective view of the stabilizing arm and the socket of the mounting bracket, illustrating yet another embodiment of the socket and one manner in which the proximal end of the stabilizing arm aligns with the socket to engage the socket in accordance with some embodiments of the present disclosure.

In some embodiments, the corresponding gear element 91 includes one or more features configured to selectively engage the gear element 90 when the proximal end 74 protrudes into and/or through the socket 38. For example, as shown in FIG. 10A, the corresponding gear element 91 may include a polygonal shape configured to selectively engage a polygonal shape of the socket 38. In another embodiment, as shown in FIG. 10B, the corresponding gear element 91 includes protrusions 93 configured to selectively engage corresponding apertures 94 surrounding the socket 38. In these and other embodiments, the gear element 90 and the corresponding gear element 91 include corresponding features configured to engage each other in any one of multiple orientations.

In some embodiments, the corresponding gear element 91 of the stabilizing arm 70 rotates independently or simultaneously with the stabilizing arm 70 to secure a desired position of the corresponding gear element 91 relative to the gear element 90. The stabilizing arm 70 may thus be secured in a desired orientation with respect to the mounting bracket 12. In these and other embodiments, the desired position and orientation of the stabilizing arm 70 relative to the mounting bracket 12 may be secured by coupling a suitable securing element 98, such as a nut, bolt, grommet, rivet, and or any other suitable fastener, to the proximal end 74 of the stabilizing arm 70 engaged with the socket 38.

Figure 6:
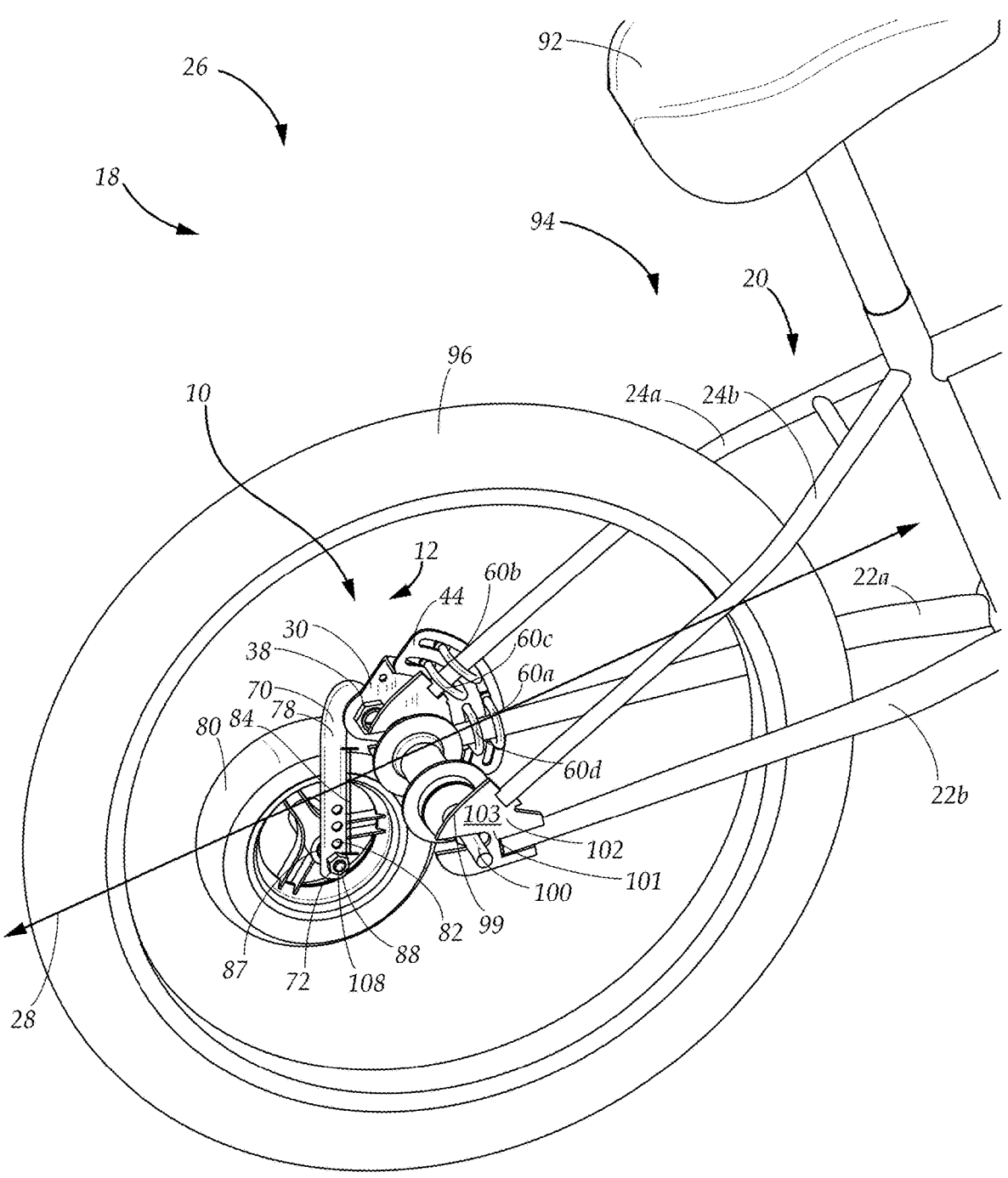
FIG. 6 is a simplified side view of the bicycle stabilizing system secured to a bicycle, illustrating the mounting bracket coupled to the chain stay and the seat stay of a bicycle frame in accordance with some embodiments of the present disclosure.

Referring now to FIG. 6, in some embodiments, the training wheel 80 is coupled to the distal end 72 of the stabilizing arm 70. The stabilizing arm 70 may be configured to retain the training wheel 80 at a desired height 84 relative to the distal end 72. To this end, in some embodiments, the elongate bar 78 may include multiple apertures 82 disposed vertically therein.

In some embodiments, a portion of the axle 87 or training wheel 80 is configured to adjustably engage one of the apertures 82 and be secured thereto via an attachment element 88. In this manner, the training wheel 80 may be adjustably retained at a desired height 84 relative to the frame 20. In some embodiments, the attachment element 88 may include an elongate bolt, screw, rod, axle, and/or any other suitable fastening device configured to extend through the training wheel 80 and a desired aperture 82 in a perpendicular direction relative to the longitudinal axis 28. The attachment element 88 may be secured relative to the aperture 82 via a securing element 108 such as a washer and/or nut or other suitable fastening device.

Referring now to FIGS. 5 and 6, while also referring to FIGS. 1 and 2, in some embodiments, a bicycle stabilizing system 26 includes one or more bicycle stabilizing assemblies 10a, 10b, multiple retaining brackets 60a-60d, and one or more training wheels 80a, 80b. The bicycle stabilizing system 26 is configured to accommodate and/or be compatible with a bicycle 18 having a frame 20 of any size, style, or shape. The frame 20 may extend along a longitudinal axis 28 and include a rear portion 94 coupled to a rear wheel 96. The rear wheel 96 may be configured to rotate about a rear axle 100 to move the bicycle 18 along a direction of travel 76.

In some embodiments, the rear portion 94 includes one or more chain stay elements 22a, 22b and one or more seat stay elements 24a, 24b. The chain stay element 22a, 22b and/or the seat stay element 24a, 24b may be coupled to the rear axle 100 via a bracket 101. The bracket 101 may be coupled to the chain stay element 22a, 22b and/or the seat stay element 24a, 24b such that the bracket 101 extends along a plane substantially parallel to the rear wheel 96 and such that the rear axle 100 extends substantially perpendicularly relative to the bracket 101 and/or rear wheel 96.

In some embodiments, each of the bicycle stabilizing assemblies 10a, 10b includes the mounting bracket 12 and the stabilizing arm 70. In some embodiments, the mounting bracket 12 is coupled to the chain stay element 22a, 22b and/or the seat stay element 24a, 24b such that the front surface 14 and/or back surface 16 of the mounting bracket 12 is substantially parallel and/or adjacent to the bracket 101.

In some embodiments, one or more edges 32, 34, 36 of the plate portion 30 substantially aligns with a corresponding edge 99 of the bracket 101. The back surface 16 of the mounting bracket 12 may be disposed substantially adjacent to an outer face 103 of the bracket 101. In some embodiments, at least some of the dimensions of the mounting bracket 12 are greater than corresponding dimensions of the bracket 101 such that the mounting bracket 12 substantially covers and/or obscures the bracket 101. In one embodiment, the elongate ledge 40 of the mounting bracket 12 is disposed adjacent to a periphery of the bracket 101 such that the bracket 101 is contained within the mounting bracket 12 and disposed adjacent to the plate portion 30.

In some embodiments, the track portion 44 extends along the top edge 36 of the plate portion 30 such that the track portion 44 is parallel to the plate portion 30. The track portion 44 may thus also be disposed adjacent to a portion of the chain stay element 22a, 22b and/or the seat stay element 24a, 24b. In some embodiments, one or more arcuate channels 46a, 46b disposed through the track portion 44 may align with the chain stay element 22a, 22b and/or the seat stay element 24a, 24b. At least one of the arcuate channels 46a, 46b may include an arc 48 having a length substantially corresponding to the track portion 44. In this manner, the mounting bracket 12 may universally align with a bicycle frame 20 having a chain stay element 22a, 22b and/or a seat stay element 24a, 24b disposed at an angle between about 20° and about 85° relative to one another.

In some embodiments, a bicycle stabilizing assembly 10a, 10b may be mounted to either side 97a, 97b of the rear wheel 96. In these and other embodiments, the frame 20 includes a first mounting bracket 12a mounted to a first chain stay element 22a and a first seat stay element 24a and a second mounting bracket 12b mounted to a second chain stay element 22b and a second seat stay element 24b. Each of the first and second mounting brackets 12a, 12b may be coupled to a corresponding chain stay element 22a, 22b and/or seat stay element 24a, 24b through the arcuate channels 46a, 46b.

In some embodiments, multiple retaining brackets 60a-60d are coupled to each of the chain stay elements 22a, 22b and/or seat stay elements 24a, 24b through the corresponding arcuate channels 46a, 46b. In some embodiments, each of the retaining brackets 60a-60d is slidably engaged with the arc 48 of the arcuate channel 46a, 46b to couple the mounting bracket 12a, 12b to the frame 20 at a desired position.

In some embodiments, a proximal end 74 of each of the stabilizing arms 70a, 70b is rotatably engaged with the socket 38 of the corresponding plate portion 30 and a distal end 72 of each of the stabilizing arms 70a, 70b is engaged with a corresponding training wheel 80a, 80b. Each stabilizing arm 70a, 70b may be formed such that the stabilizing arm 70a, 70b extends longitudinally from the rear wheel 96 towards a ground surface (not shown). Each training wheel 80a, 80b may be coupled to a corresponding stabilizing arm 70a, 70b such that the training wheel 80a, 80b is maintained substantially parallel to and offset from the rear wheel 96. In some embodiments, the stabilizing arm 70a, 70b is rotated within the socket 38 to orient the associated training wheel 80a, 80b with respect to the rear wheel 96 as desired, as discussed in more detail below.

In some embodiments, a height 84 of the training wheel 80a, 80b with respect to the distal end 72 of a corresponding elongate bar 78a, 78b may be selectively adjusted to universally accommodate various sizes and styles of bicycle frames 20. For example, in some embodiments, each elongate bar 78a, 78b includes multiple apertures 82 disposed in a vertical configuration. An axle 87 may be integrated with and/or coupled to the training wheel 80a, 80b and configured to adjustably engage one of the apertures 82 at a desired height 84. In some embodiments, one or more attachment elements 88 is configured to couple to an end of the axle 87 to couple the axle 87 to the elongate bar 78a, 78b at the desired height 84.

In certain embodiments, the attachment element 88 may include, for example, a bolt, a screw, a rod, and/or any other suitable fastener or fastening technique to rotatably couple the training wheel 80a, 80b to the stabilizing arm 70a, 70b at the desired height. In certain embodiments, the attachment element 88 is configured to allow the training wheel 80a, 80b to rotate about the axle 87 in a direction substantially parallel to the rear wheel 96.

Referring now to FIGS. 7A-7C and 11A-11B, in some embodiments, one or more of the retaining brackets 60a-60d may include at least one end 62 engaged with and slidable along the arc 48 of an arcuate channel 46a, 46b. In these and other embodiments, the end 62 is configured to extend through the arcuate channel 46a, 46b from the back surface 16 toward the front surface 14. In this manner, each of the retaining brackets 60a-60d may extend around the chain stay element 22a, 22b and/or the seat stay element 24a, 24b such that the chain stay element 22a, 22b and/or the seat stay element 24a, 24b is maintained adjacent to the back surface 16 of the track portion 44.

In some embodiments, a securing element 64 may be coupled to the end 62 through the front surface 14 such that the securing element 64 is thereby maintained adjacent to the front surface 14. In some embodiments, the securing element 64 is fastened to the end 62 via complementary threads, an adhesive, a press fit, and/or any other suitable mechanical fastener or fastening technique. In this manner, the mounting bracket 12 may be securely coupled to the frame 20 (shown in FIG. 5) be a desired position.

Figures 7A, 7B, 7C:
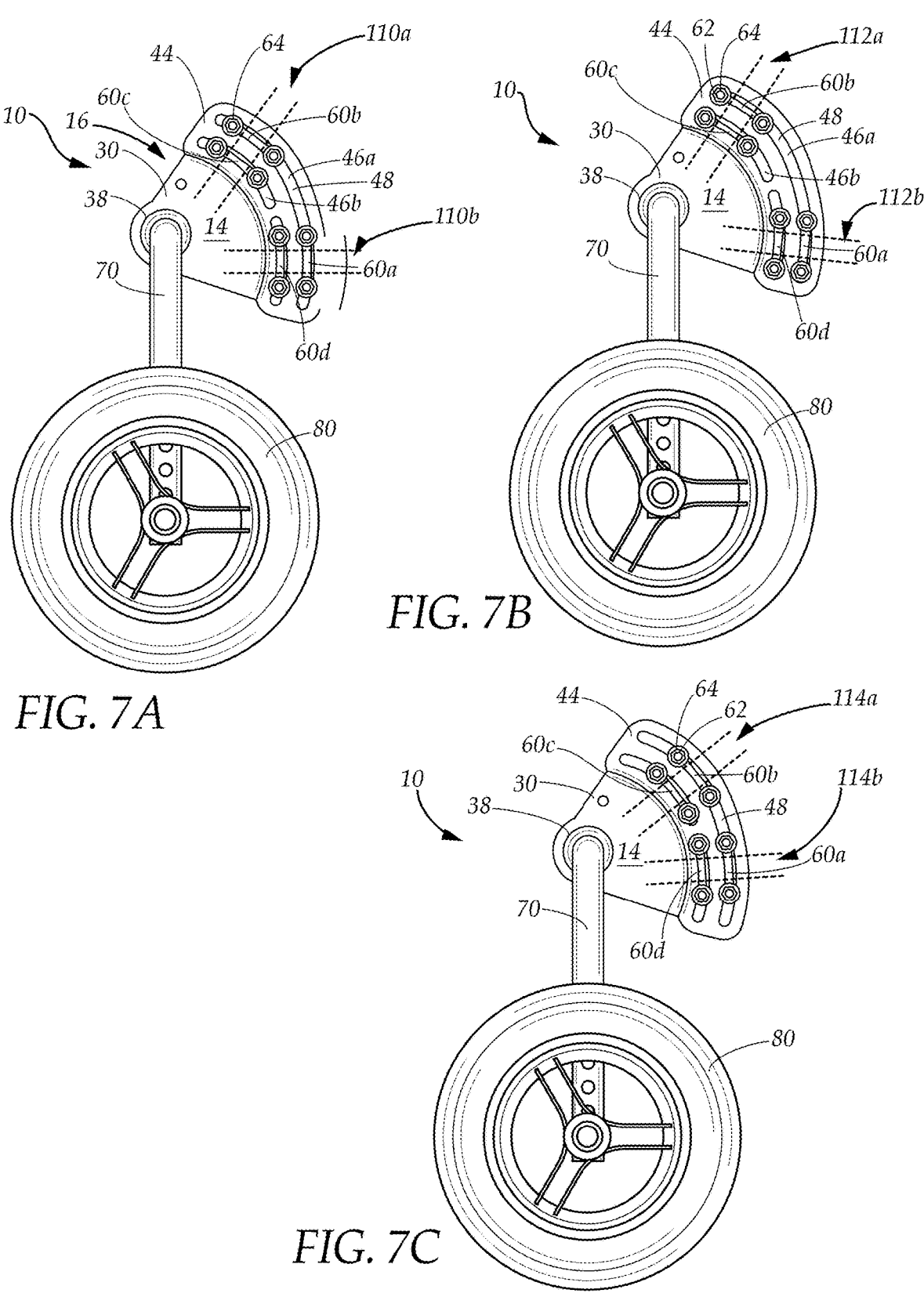
FIG. 7A is a side view of a representative bicycle stabilizing assembly illustrating multiple U-brackets selectively positioned within the arcuate tracks in a first position to accommodate a bicycle including a chain stay and seat stay of a certain configuration in accordance with one embodiment of the present disclosure.
FIG. 7B is a side view of another representative bicycle stabilizing assembly illustrating multiple U-brackets selectively positioned within the arcuate tracks in a second position to accommodate a bicycle including a chain stay and seat stay of a certain configuration in accordance with another embodiment of the present disclosure.
FIG. 7C is a side view of another representative bicycle stabilizing assembly illustrating multiple U-brackets selectively positioned in the arcuate tracks in a third position to accommodate a bicycle including a chain stay and seat stay of a certain configuration in accordance with another embodiment of the present disclosure.

In some embodiments, one or more retaining brackets 60a-60d may be aligned between adjacent arcuate channels 46a, 46b to correspond to a position of the chain stay element 22a, 22b or the seat stay element 24a, 24b. For example, as shown in FIG. 7A, one pair of retaining brackets 60b, 60c may be aligned in a first position 110a to correspond to the seat stay element 24a, 24b while another pair of retaining brackets 60a, 60d may be aligned in a second position 110b to correspond to the chain stay element 22a, 22b. The position of the each of the pairs of retaining brackets 60a-60d may be adjusted to universally accommodate bicycle frames 20 (shown in FIG. 5) having varying dimensions and angles between the seat stay element 24a, 24b and the chain stay element 22a, 22b.

Figures 11A, 11B:
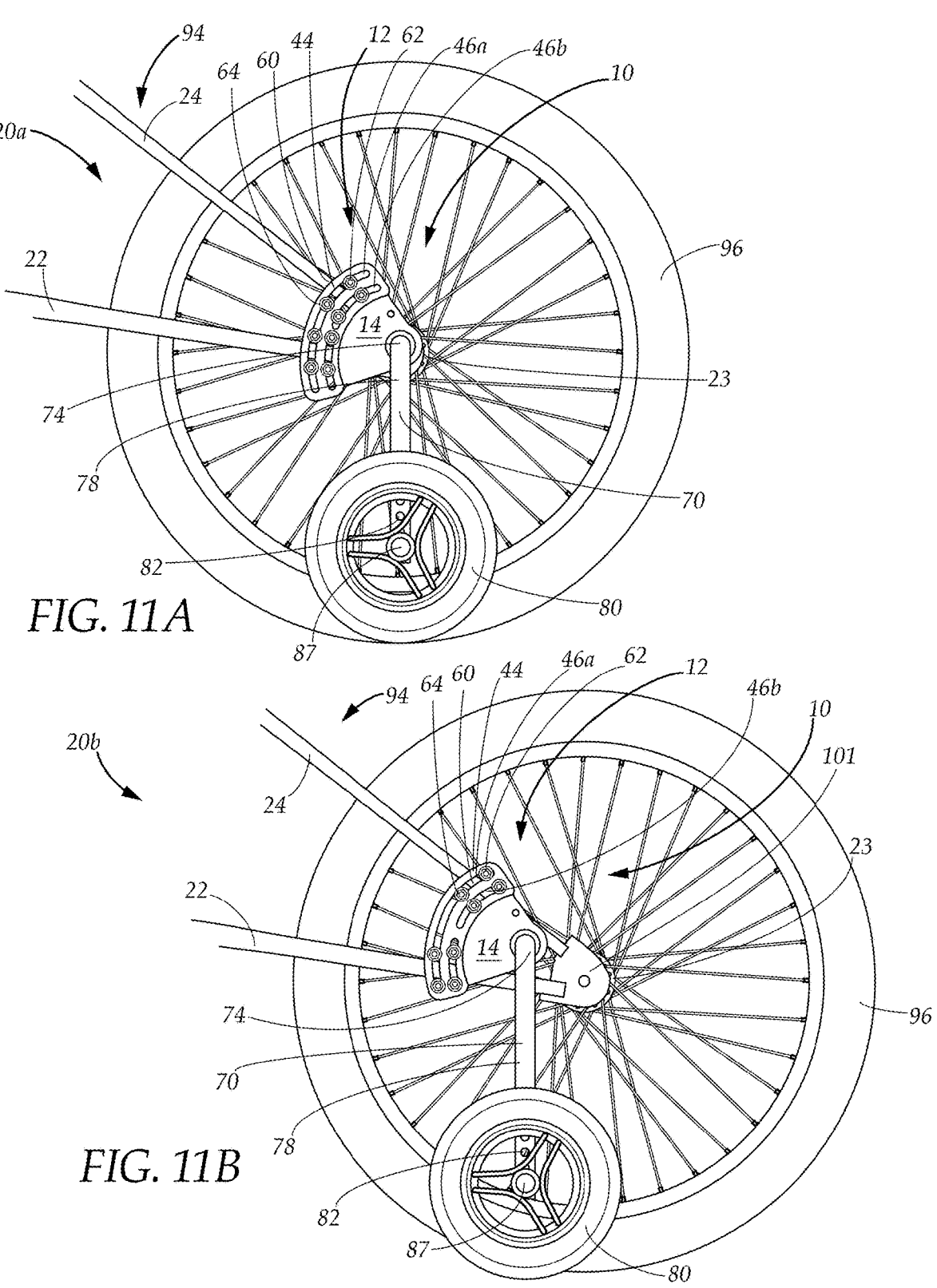
FIG. 11A is a side view of the bicycle stabilizing system mounted onto a bicycle, illustrating one mount position of the mounting bracket relative to the bicycle frame of the bicycle in accordance with some embodiments of the present disclosure.
FIG. 11B is a side view of the bicycle stabilizing system mounted onto a bicycle, illustrating another mount position of the mounting bracket relative to the bicycle frame of the bicycle in accordance with some embodiments of the present disclosure.

For example, the positions 110a, 110b of one or both pairs of laterally adjacent retaining brackets 60b, 60c may be adjusted to universally accommodate bicycle frames 20 (shown in FIG. 5) having various dimensions and/or varying angles between the seat stay element 24a, 24b and the chain stay element 22a, 22b. In one embodiment, as shown in FIGS. 7C and 11A while still referring to FIG. 7A, for example, each of the retaining brackets 60a-60d is slidable along its corresponding arcuate channel 46a, 46b to move from its original position 110a, 110b to a new position 114a, 114b. A pair of laterally adjacent retaining brackets 60-60d may be moved in opposing directions towards each other to reduce a distance between the pair and thereby accommodate a smaller frame 20 (shown in FIG. 5) and/or a reduced angle between the seat stay element 24a, 24b and the chain stay element 22a, 22b.

In another embodiment, as shown in FIGS. 7B and 11B while still referring to FIG. 7A, for example, each of a pair of retaining brackets 60a-60d is slidable along its corresponding arcuate channel 46a, 46b to a new position 112a, 112b in an opposite direction away from each other to increase a distance between relative to their original positions 110a, 110b. In some embodiments, moving each of a pair of retaining brackets 60a-60d in this manner may accommodate a bigger frame 20 (shown in FIG. 5) and/or an increased angle between the seat stay element 24a, 24b and the chain stay element 22a, 22b. Of course, each retaining bracket 60a-60d may be individually slidable along its corresponding arcuate channel 46a, 46b and need not be moved in a pair, in a same direction, in an opposite direction, and/or a same distance as any other retaining bracket 60a-60d.

Referring now to FIGS. 8A-8C and 12A-12B, the stabilizing arm 70 may be rotated within the socket 38 to orient the training wheel 80 with respect to the frame 20 and/or rear wheel 96 as desired. In some embodiments, the stabilizing arm 70 is rotated within the socket 38 to change the orientation of the training wheel 80 with respect to the frame 20 and/or rear while 96 while the positions 110a, 110b of the retaining brackets 60a-60d remain fixed.

Figures 8A, 8B, 8C:
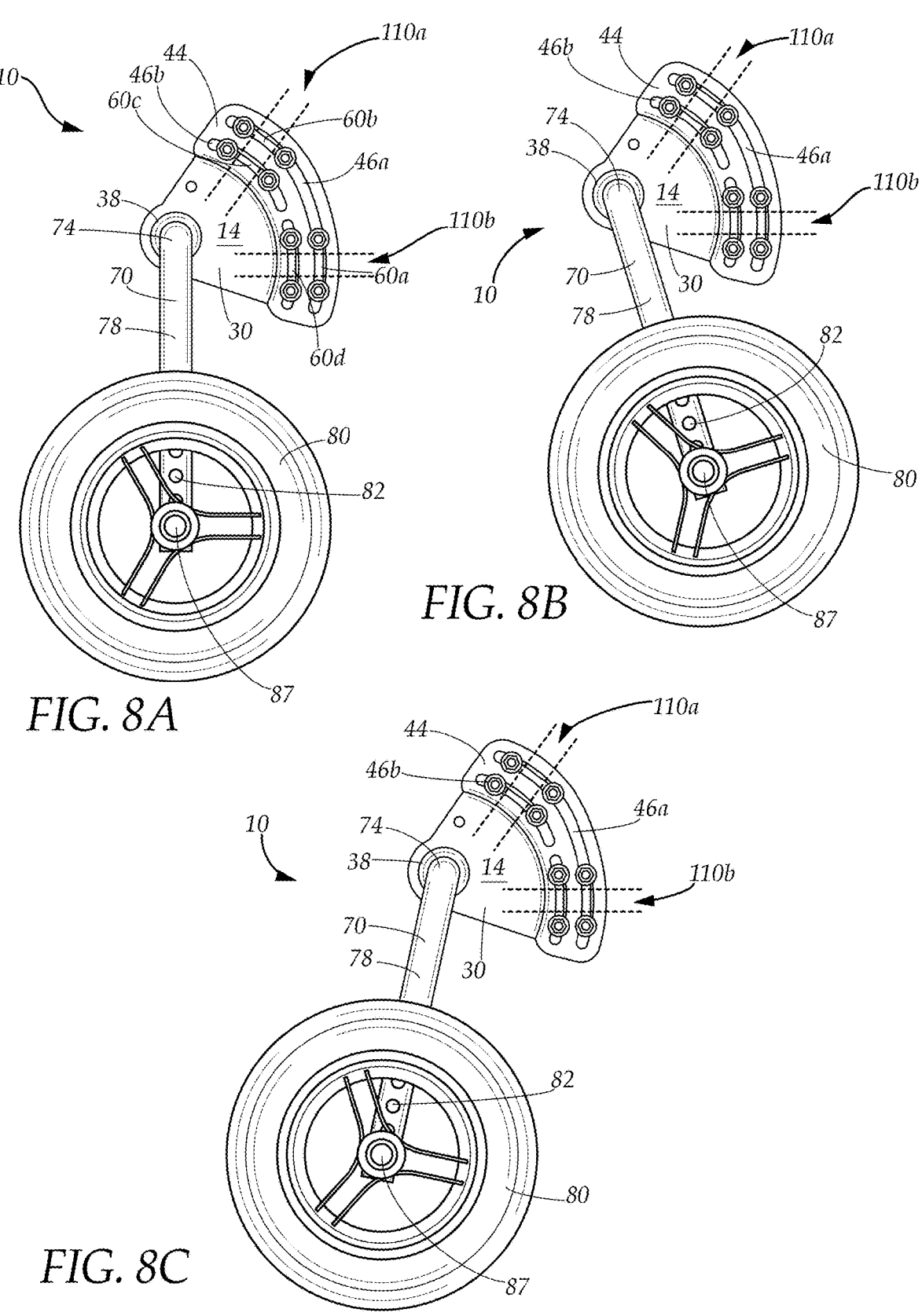
FIG. 8A is a side view of a representative bicycle stabilizing assembly illustrating the stabilizing arm positioned within the socket in a first orientation with respect to the mounting bracket in accordance with one embodiment of the present disclosure.
FIG. 8B is a side view of another representative bicycle stabilizing assembly illustrating the stabilizing arm positioned within the socket in a second orientation with respect to the mounting bracket in accordance with another embodiment of the present disclosure.
FIG. 8C is a side view of another representative bicycle stabilizing assembly illustrating the stabilizing arm positioned within the socket in a third orientation with respect to the mounting bracket in accordance with one embodiment of the present disclosure.
Figures 12A, 12B:
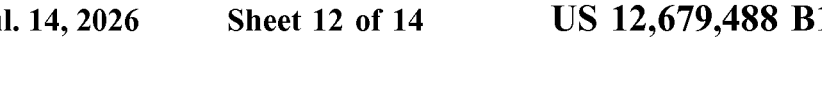
FIG. 12A is a side view of the bicycle stabilizing system mounted onto a bicycle, illustrating one orientation of the stabilizing arm relative to a mounting bracket in accordance with some embodiments of the present disclosure.
FIG. 12B is a side view of the bicycle stabilizing system mounted onto a bicycle, illustrating another orientation of a stabilizing arm relative to a mounting bracket in accordance with some embodiments of the present disclosure.

For example, in one embodiment, as shown in FIG. 8A while also referring to FIG. 5, the proximal end 74 of the stabilizing arm 70 is situated within the socket 38 such that the elongate bar 78 is substantially perpendicular relative to the position 110b of a pair of retaining brackets 60a, 60d corresponding to the chain stay element 22a, 22b. In another embodiment, as shown in FIGS. 8B and 12B while also referring to FIG. 5, the proximal end 74 of the stabilizing arm 70 is rotated in a counter-clockwise direction within the socket 38 to decrease the angle between the elongate bar 78 and the pair of retaining brackets 60a, 60d corresponding to the chain stay element 22a, 22b. In another embodiment, as shown in FIGS. 8C and 12A while also referring to FIG. 5, the proximal end 74 of the stabilizing arm 70 is rotated in a clockwise position within the socket 38 to increase the angle between the elongate bar 78 and the pair of retaining brackets 60a, 60d corresponding to the chain stay element 22a, 22b. Of course, the proximal end 74 of the stabilizing arm 70 may be rotated in either a clockwise or counter-clockwise direction to increase or decrease the angle between the elongate bar 78 and the chain stay element 22a, 22b.

It is understood that when an element is referred hereinabove as being "on" another element, it can be directly on the other element or intervening elements may be present therebetween. In contrast, when an element is referred to as being "directly on" another element, there are no intervening elements present. Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly. The term "substantially" is defined as at least 95% of the term being described and/or within a tolerance level known in the art and/or within 5% thereof.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

What is claimed is:

1. A bicycle stabilizing assembly configured to couple to a frame of a bicycle, the bicycle stabilizing assembly comprising:

a mounting bracket having a front surface and a back surface, the mounting bracket configured to engage at least one of a seat stay and a chain stay of the frame of the bicycle, the mounting bracket comprising:

a plate portion comprising a bottom edge, a side edge, a top edge extending between the bottom edge and the side edge, and a socket disposed substantially adjacent to the bottom edge, the top edge including a first end adjacent to the side edge and a second end adjacent to the bottom edge; and a substantially planar track portion extending along the top edge such that the plate portion is substantially parallel to the track portion, the track portion comprising at least one arcuate channel extending between the front surface and the back surface, wherein the at least one arcuate channel comprises an arc extending between the first end and the second end such that the arc spans at least a distance between the seat stay and the chain stay of the frame of the bicycle, the at least one arcuate channel configured to slidably receive a retaining bracket along the arc to engage the seat stay or the chain stay; and a stabilizing arm comprising an elongate bar including a distal end and a proximal end, wherein the proximal end is configured to rotatably engage the socket such that an orientation of the stabilizing arm with respect to the mounting bracket is selectively adjustable, and wherein the distal end is configured to retain a training wheel at a desired height relative to the distal end.

2. The bicycle stabilizing assembly of claim 1, wherein the distal end of the elongate bar comprises a plurality of apertures disposed vertically thereon, wherein the plurality of apertures are configured to adjustably retain the training wheel at a desired height with respect to the stabilizing arm.

3. The bicycle stabilizing assembly of claim 1, wherein the socket comprises a gear element configured to selectively engage the proximal end of the stabilizing arm in a plurality of different orientations in which the stabilizing arm maintains a different angle with respect to the plate portion to allow the stabilizing arm to be oriented as desired with respect to the mounting bracket.

4. The bicycle stabilizing assembly of claim 1, further comprising a retaining bracket configured to couple the mounting bracket to the frame, wherein the retaining bracket comprises at least one end configured to extend through at least a portion of the at least one arcuate channel to selectively engage the chain stay or seat stay to couple the mounting bracket to the frame at a desired position.

5. The bicycle stabilizing assembly of claim 4, wherein the retaining bracket further comprises a securing element configured to selectively engage the at least one end to secure the retaining bracket on the seat stay or chain stay to couple the mounting bracket to the frame at the desired position.

6. The bicycle stabilizing assembly of claim 1, wherein the frame extends along a longitudinal axis and the chain stay is disposed substantially parallel to the longitudinal axis.

7. The bicycle stabilizing assembly of claim 1, further comprising an elongate ledge disposed between the top edge of the plate portion and a lower edge of the track portion, wherein the elongate ledge is substantially planar and extends substantially perpendicularly between the plate portion and the track portion such that the plate portion and the track portion are parallel but noncoplanar.

8. The bicycle stabilizing assembly of claim 1, wherein the at least one arcuate channel comprises a first arcuate channel and a second arcuate channel, the first arcuate channel disposed substantially parallel to the second arcuate channel, the second arcuate channel disposed interiorly with respect to the first arcuate channel.

9. The bicycle stabilizing assembly of claim 8, wherein the at least one arcuate channel comprises a plurality of track sections disposed end-to-end along the arc, wherein each of the plurality of track sections is unconnected to each other of the plurality of track sections, wherein each of the plurality of track sections comprises a first terminus and a second terminus, and wherein the first terminus of one of the plurality of track sections is disposed substantially adjacent to the second terminus of an adjacent one of the plurality of track sections.

10. The bicycle stabilizing assembly of claim 9, wherein a pathway extends between the first terminus of the one of the plurality of track sections and the second terminus of the adjacent one of the plurality of track sections to separate the one of the plurality of track sections from the adjacent one of the plurality of track sections.

11. A bicycle stabilizing system, comprising:
a bicycle stabilizing assembly coupled to at least one of a chain stay element and a seat stay element of a frame of a bicycle, the bicycle stabilizing assembly comprising:
a mounting bracket comprising a front surface and a back surface, the mounting bracket comprising:
a plate portion comprising a bottom edge, a side edge, and a top edge extending between the bottom edge and the side edge, the plate portion further comprising a socket disposed substantially adjacent to the bottom edge;

a substantially planar track portion extending along the top edge such that the plate portion is disposed substantially parallel to the track portion, wherein the track portion comprises at least one arcuate channel disposed therethrough, wherein the at least one arcuate channel comprises an arc extending between a first end and a second end; and a stabilizing arm comprising a distal end, a proximal end, and an elongate bar therebetween, wherein the proximal end is configured to rotatably engage the socket such that an orientation of the stabilizing arm with respect to the mounting bracket is selectively adjustable;

a retaining bracket coupled to at least one of the chain stay element and the seat stay element and slidably engaged with the arc such that the mounting bracket is coupled to the frame at a desired position; and a training wheel adjustably coupled to the elongate bar to permit a height of the training wheel to be selectively adjusted relative to the distal end.

12. The bicycle stabilizing system of claim 11, wherein the track portion comprises a first arcuate channel forming a continuous arc between the first end and the second end.

13. The bicycle stabilizing system of claim 12, wherein the track portion further comprises a second arcuate channel disposed substantially parallel to the first arcuate channel, wherein the second arcuate channel forms a segmented arc extending between the first end and the second end, wherein the segmented arc comprises at least a first track section and a second track section disposed end-to-end between the first end and the second end, wherein a pathway is disposed between the first track section and the second track section.

14. The bicycle stabilizing system of claim 11, wherein the elongate bar comprises a plurality of apertures disposed therein, wherein each of the plurality of apertures is disposed along the elongate bar in a vertical configuration.

15. The bicycle stabilizing system of claim 14, further comprising an attachment element configured to selectively engage the training wheel and one of the plurality of apertures to couple the training wheel to the elongate bar.

16. The bicycle stabilizing system of claim 11, wherein the mounting bracket further comprises an auxiliary connection element disposed in the plate portion and configured to couple an auxiliary vehicle to the frame of the bicycle, wherein the auxiliary connection element comprises a hole configured to engage an auxiliary connector coupled to the auxiliary vehicle.

17. The bicycle stabilizing system of claim 11, wherein the socket comprises a gear element configured to selectively engage the proximal end of the stabilizing arm to orient a position of the stabilizing arm with respect to the mounting bracket.

18. The bicycle stabilizing system of claim 17, further comprising at least one securing element configured to secure a position of the proximal end relative to the gear element.

19. The bicycle stabilizing system of claim 11, wherein the retaining bracket comprises a first retaining bracket coupled to the chain stay element and a second retaining bracket coupled to the seat stay element.

20. The bicycle stabilizing system of claim 19, wherein the first retaining bracket is coupled to a first arcuate channel of the track portion and wherein the second retaining bracket is coupled to a second arcuate channel of the track portion.

* * * * *